US008359645B2

(12) United States Patent
Kramer et al.

(10) Patent No.: US 8,359,645 B2
(45) Date of Patent: Jan. 22, 2013

(54) DYNAMIC PROTECTION OF UNPATCHED MACHINES

(75) Inventors: Michael Kramer, Yonkers, NY (US); Art Shelest, Sammamish, WA (US); Carl M Carter-Schwendler, Redmond, WA (US); Gary S Henderson, Redmond, WA (US); Scott A Field, Redmond, WA (US); Sterling M Reasor, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1148 days.

(21) Appl. No.: 11/090,679

(22) Filed: Mar. 25, 2005

(65) Prior Publication Data
US 2006/0218635 A1 Sep. 28, 2006

(51) Int. Cl.
*G06F 11/00* (2006.01)
*G06F 12/14* (2006.01)
(52) U.S. Cl. ............................................ 726/22; 726/23
(58) Field of Classification Search ............... 726/22, 726/23
See application file for complete search history.

(56) References Cited

U.S. PATENT DOCUMENTS

| | | | |
|---|---|---|---|
| 5,951,698 A | 9/1999 | Chen et al. | |
| 6,199,204 B1 | 3/2001 | Donohue | |
| 6,275,942 B1 | 8/2001 | Bernhard et al. | |
| 6,338,141 B1 | 1/2002 | Wells | |
| 6,704,874 B1 | 3/2004 | Porras et al. | |
| 7,084,760 B2 * | 8/2006 | Himberger et al. | 340/540 |
| 7,089,428 B2 | 8/2006 | Farley et al. | |
| 2001/0039579 A1 * | 11/2001 | Trcka et al. | 709/224 |
| 2002/0040439 A1 * | 4/2002 | Kellum | 713/200 |
| 2002/0184619 A1 * | 12/2002 | Meyerson | 717/173 |
| 2002/0194490 A1 | 12/2002 | Halperin et al. | |
| 2003/0131256 A1 | 7/2003 | Ackroyd | |
| 2004/0230835 A1 | 11/2004 | Goldfeder et al. | |
| 2005/0050378 A1 * | 3/2005 | Liang | 714/4 |
| 2005/0108578 A1 | 5/2005 | Tajalli et al. | |

(Continued)

FOREIGN PATENT DOCUMENTS
JP 2004-355450 12/2004
KR 1020030017063 A 3/2003

(Continued)

OTHER PUBLICATIONS

International Search Report cited in PCT Application No. PCT/US2005/027328 dated Dec. 2, 2005.

(Continued)

*Primary Examiner* — Christopher Brown
(74) *Attorney, Agent, or Firm* — Microsoft Corporation

(57) ABSTRACT

A system and method for protecting a computer system connected to a communication network from a potential vulnerability. The system and method protects a computer system that is about to undergo or has just undergone a change in state that may result in placing the computer system at risk to viruses, and the like, over a communication network. The system and method first detect an imminent or recent change in state. A security component and a fixing component react to the detection of the change in state. The security component may raise the security level to block incoming network information, other than information from a secure or known location, or information requested by the computer system. The fixing component implements a fixing routine, such as installing missing updates or patches, and on successfully completing the fixing routine, the security level is relaxed or lowered.

20 Claims, 10 Drawing Sheets

U.S. PATENT DOCUMENTS

| | | | |
|---|---|---|---|
| 2005/0198527 A1 | 9/2005 | Johnson et al. | |
| 2005/0204050 A1* | 9/2005 | Turley et al. | 709/229 |
| 2006/0069909 A1* | 3/2006 | Roth et al. | 713/100 |
| 2006/0174319 A1* | 8/2006 | Kraemer et al. | 726/1 |

FOREIGN PATENT DOCUMENTS

| | | |
|---|---|---|
| KR | 1020040004944 A | 6/2004 |
| KR | 1020040083409 A | 10/2004 |

OTHER PUBLICATIONS

Int. Preliminary Report on Patentability cited in PCT Application No. PCT/US2005/027328 dated Mar. 19, 2009.
English translation of Japanese Office Action cited in Japanese Application No. 2008-502965 dated Apr. 22, 2011.
Chinese Office Action cited in Chinese Application No. 200580048740.1 dated Mar. 1, 2010.
Chinese Office Action cited in Chinese Application No. 200580048740.1 dated Jan. 26, 2011.
Japanese Office Action cited in related Japanese Application No. 200-502965 dated Aug. 12, 2011.
Korean Office Action cited in related Korean Application No. 10-2007-7018123 dated Oct. 28, 2011.
Reply to Japanese Office cited in Japanese Application No. 2008502965 dated Jul. 22, 2011, 22 pgs.
Reply to Japanese Office Action cited in Japanese Application No. 2008-502965 dated Sep. 21, 2011, 4 pgs.
Reply to Chinese Office Action cited in Chinese Application No. 2005800487401 dated Mar. 30, 2010, 13 pgs.
Reply to Second Chinese Office Action cited in Chinese Application No. 2005800487401 dated Apr. 8, 2011, 14 pgs.
Third Chinese Office Action cited in Chinese Application No. 2005800487401 dated Aug. 12, 2011, 9 pgs.
Reply to Third Chinese Office Action cited in Chinese Application No. 2005800487401 dated Oct. 27, 2011, 12 pgs.
Final Chinese Office Action cited in Chinese Application No. 2005800487401 dated May 3, 2012, 8 pgs.
Reply to Final Chinese Office Action cited in Chinese Application No. 20058004874010 dated May 16, 2012, 10 pgs.
Claims in Reply to Korean Office Action cited in Korean Application No. 10-2007-7018123 dated Nov. 26, 2011, 5 pgs.
Korean Notice of Allowance cited in Korean Application No. 10-2007-7018123 dated May 8, 2012, 2 pgs.

* cited by examiner

DYNAMIC PROTECTION OF UNPATCHED MACHINES

FIELD OF THE INVENTION

The present invention relates to a computer system and to a computer-implemented method for securing computer systems connected to a network from attacks.

BACKGROUND OF THE INVENTION

As more and more computers and other computing devices are inter-connected through various networks, such as the Internet, computer security has become increasingly more important, particularly, the prevention of attacks delivered over a network. As those skilled in the art will recognize, these attacks come in many different forms, including, but not limited to, computer viruses, computer worms, system component replacements, denial of service, even misuse and abuse of legitimate computer system features, all of which exploit one or more computer system vulnerabilities for illegitimate purposes. While those skilled in the art will realize that the various computer attacks are technically distinct from one another, for purposes of the present invention and for simplicity in description, all of these attacks will be generally referred to hereafter as malware.

When a computer system is attacked or "infected" by malware, the adverse results are varied, including disabling system devices; erasing or corrupting firmware, applications, or data files; transmitting potentially sensitive data to another location on the network; shutting down the computer system; or causing the computer system to crash. Yet another pernicious aspect of malware is that an infected computer system is used to infect other computers.

FIG. 1 is a pictorial diagram illustrating an exemplary networked environment 100 over which malware can be commonly distributed. As shown in FIG. 1, the typical exemplary networked environment 100 may include a plurality of computer systems 104-116 inter-connected via a communication network 102, such as an intranet or via a larger communication network including the global TCP/IP network commonly referred to as the Internet. For whatever reason, a malicious party on computer 116 connected to the network 102, develops malware 118, and releases it on the network 102. The malware 118 is received by, and infects, one or more of the computer systems 106-112. As is typical with most malware, once infected, one computer is used to infect other computers, which in turn infects yet other computers. Clearly, due to the speed and reach of the modern computer networks, a piece of malware 118 can "grow" at an exponential rate, and quickly become a local epidemic that quickly escalates into a global computer pandemic.

Malware can also leverage a computer system's features in an attack. Thus, operating system providers must now, for economic and contractual reasons, continually analyze their operating system functions to identify weaknesses or vulnerabilities that may be exploited through malware. For purposes of the present discussion, any avenue by which malware may attack a computer system will be generally referred to as a computer system vulnerability, or simply a vulnerability.

As vulnerabilities are identified and addressed in an operating system, or other computer system components, the provider will typically release a software update to remedy the vulnerability. The system provider will typically make available the necessary updates from an update server that is maintained by a trustworthy source. The update server, such as update server 104, is also communicatively connected to the network 102 to which all other computer systems 106-114 are connected. The updates, frequently referred to as patches, are meant to be installed on a computer system by the user in order to secure the computer system from the identified vulnerabilities. However, these updates are, in essence, code changes to the components of the operating system, device drivers, or software applications. Because these updates are code changes, the software updates require substantial in-house testing prior to being released to the public.

Under the current system, there is a period of time, referred to hereafter as a vulnerability window, that exists between when new malware is released on the network 102 and when a computer system is updated to protect against it. As the name suggests, it is during this vulnerability window that a computer system is vulnerable, or at risk to becoming infected to the newest malware. FIGS. 2A-2C are block diagrams of exemplary timelines 200, 220, and 232, illustrating possible vulnerability windows.

In FIG. 2A, an operating system provider identifies the presence of a vulnerability in the released operating system at event 202. For example, in one scenario, the operating system provider, performing its own internal analysis of a released operating system, uncovers a previously unknown vulnerability that could be used to attack a computer system. In an alternative scenario, the previously unknown vulnerability is discovered by third parties, including organizations that perform system security analyses on computer systems, and relays information regarding the vulnerability to the operating system provider.

Once the operating system provider is aware of the presence of the vulnerability, the operating system provider addresses the vulnerability at event 204, which leads to the creation and release of a patch to secure any computer systems running the vulnerable operating system. Typically, an operating system provider will make some type of announcement that there is a system patch available, along with a recommendation to all operating system users to install the patch. The patch is usually placed in a known location, such as update server 104 on the network 102, shown in FIG. 1, for downloading and installation onto vulnerable computer systems.

Unfortunately, as happens all too often, after the operating system provider releases the patch, a malicious party downloads the patch and, using some reverse engineering, as well as any information made public by the operating system provider or others, identifies the specifics regarding the "fixed" vulnerability in the operating system at event 206. Using this information, the malicious party creates new malware to attack the underlying vulnerability. Alternatively, an attacker develops an exploit for the vulnerability independently of examining the update or patch. At event 208, the malicious party releases new malware onto the network. While the goal of issuing a software patch is to correct an underlying vulnerability, the patch is often a complex piece of software code which itself, unfortunately, may create or contain a new vulnerability that could be attacked by malware created by a malicious party. Thus, in addition to evaluating what the patch corrects, the patch is also evaluated for potential vulnerabilities.

While a patch is available to computer system users, the malicious party realizes that, for various reasons including those described above, not every vulnerable computer system will be immediately upgraded. Thus, at event 208, the release of malware opens a vulnerability window 212, in which the vulnerable computer systems are susceptible to this malware.

Only when the patch is finally installed on a computer system at event 210, is the vulnerability window 212 closed for that computer system.

Malware may also be released on the network that takes advantage of a previously unknown vulnerability in the operating system. FIG. 2B illustrates a vulnerability window 230 with regard to a timeline 220 under this scenario. Thus, as shown on timeline 220, at event 222, a malicious party releases new malware that takes advantage of a previously unknown vulnerability in the operating system. As this is new malware, there is no operating system patch available to protect vulnerable computer systems from the attack. Correspondingly, the vulnerability window 230 is opened immediately after release of the malware.

At some point after the new malware is circulating on the network, the operating system provider detects the new malware at event 224. As those skilled in the art will appreciate, typically, the presence of new malware on the network can be detected within a matter of hours by the operating system provider.

Once the latest malware is detected, the operating system provider begins the process of analysis to determine whether the operating system must be patched to protect the computer system from the malware. As a result of this effort, at event 226, the operating system provider releases an update, i.e., a software patch, to the operating system that addresses the vulnerability. Subsequently, at event 228, the update is installed on a user's computer system, thereby protecting the computer system and bringing the vulnerability window 230 to a close.

Unfortunately, many users may consider themselves free from ever being vulnerable to any one specific piece of malware once an update has been installed on the computer system. In reality, however, even after the user has updated the computer system with all possible available updates, the computer system may become vulnerable once again to the same piece of malware that had, at one time, been rendered ineffective. In other words, a previously closed vulnerability window may open at a future time.

Referring to FIG. 2C, a previously closed vulnerability window may be reopened at a future time on timeline 232 whenever the computer system must revert, for whatever reason, to a computer system "state" corresponding to a time when the update is not installed on the computer system. In the normal course of events, a computer system is patch non-compliant at event 234 on timeline 232, and subsequently becomes patch compliant at event 236, closing the vulnerability window 240 as described above. However, at a future time, such as at event 238, a computer system may find it necessary to return under scenario 244 to a previous state, and could possibly revert to a state prior to event 236, but after event 234, which corresponds to a time when the computer system is not updated, thus reopening the previously closed vulnerability window 240 and placing the computer system at risk to attacks from the specific malware, which had at one time been rendered ineffective against the computer system. It is also possible that the computer system may revert under a different set of circumstances under scenario 246 to a secure state 242 after the vulnerability window 240 has been closed, or even before event 234, which corresponds to a time when the computer system is updated as fully as possible. The indeterminate nature of state changes poses concerns for some users of a computer system.

As can be appreciated from the discussion above, a vulnerability window can be reopened at a future time, and any piece of malware circulating on a network still poses a security threat to a computer system, even if the computer system was fully updated and patch compliant. The potential of placing the computer system at risk may be too great for a computer system user to accept since an infected computer may cost the computer's owner substantial amounts of money to "disinfect" and repair. This cost can be enormous when dealing with large corporations or entities that may have thousands or hundreds of thousands of computers connected to a network. Such a cost is further amplified by the possibility that tampering or destruction of customer data may ensue, which may be extremely difficult or impossible to trace and remedy. What is needed is a system and method for securing a computer system against malware in a proactive manner when a computer system event is about to occur that could potentially expose the computer system to a vulnerability. These, and other issues are addressed by the present invention.

SUMMARY OF THE INVENTION

The present invention is related to a computer system and to a method implemented on a computer system for dynamically protecting the computer system from attacks over a communication network.

One embodiment of the present invention includes a system for protecting a computer connected to a communication network from a potential vulnerability. The system may include a state-change-indicating component and/or a state change discovery component that may set an indication and/or discover when a computer system may undergo a state change. The system may include a security component interposed between a network and the computer system that raises the security level of the computer system on an indication of an imminent or recent state change. The system may include a fixing component that fixes any vulnerabilities that may result from a computer system state change. The system may return the security level to the normal level of protection upon successfully completing any routines to fix the vulnerabilities. The reason that the elevated level of protection is not a desired permanent state, is that some desired functionality may become disabled as a result of the elevated protection level.

A second embodiment of the present invention includes a method for protecting a computer system connected to a communication network from a potential vulnerability regression. The method may include setting an indication of a computer system state change, or having a means for discovering the state change. The method may include raising the security level of the computer system on detecting an indication of a state change or discovering the state change. Changing the state of the computer may occur from an operating system upgrade, an application upgrade, a new application installation, a reinstallation of an application, a system restore to a previous saved state, or a system reboot. The method may include fixing any vulnerabilities that may have resulted from the change in state, and then relaxing the security level to its previous setting on successfully completing a routine to fix any vulnerabilities. Alternatively, successful completion may be determining the absence of any vulnerabilities.

The present invention provides a system and a method that proactively protects a computer system when a computer system is about to undergo a change in state that may result in placing the computer system at risk to attacks from viruses, and the like, over a communication network. In one embodiment, before the computer system state is changed, the security component of the computer system places the computer system in an "isolated" mode that may block all incoming network traffic, except for communications from a secure location, a known location, or information requested by the computer system. When the computer system has concluded that it is no longer at risk or vulnerable, the security level of the computer system may be lowered or relaxed to the "normal" or previous level that allows incoming network traffic through the security component. A computer system user or a computer system administrator may have control of the configuration of the security measures in both the isolated mode and the normal mode. In another embodiment, after the system state is changed, but before the computer resumes its normal operation, the security component of the computer system places the computer system in the isolated mode.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 3:
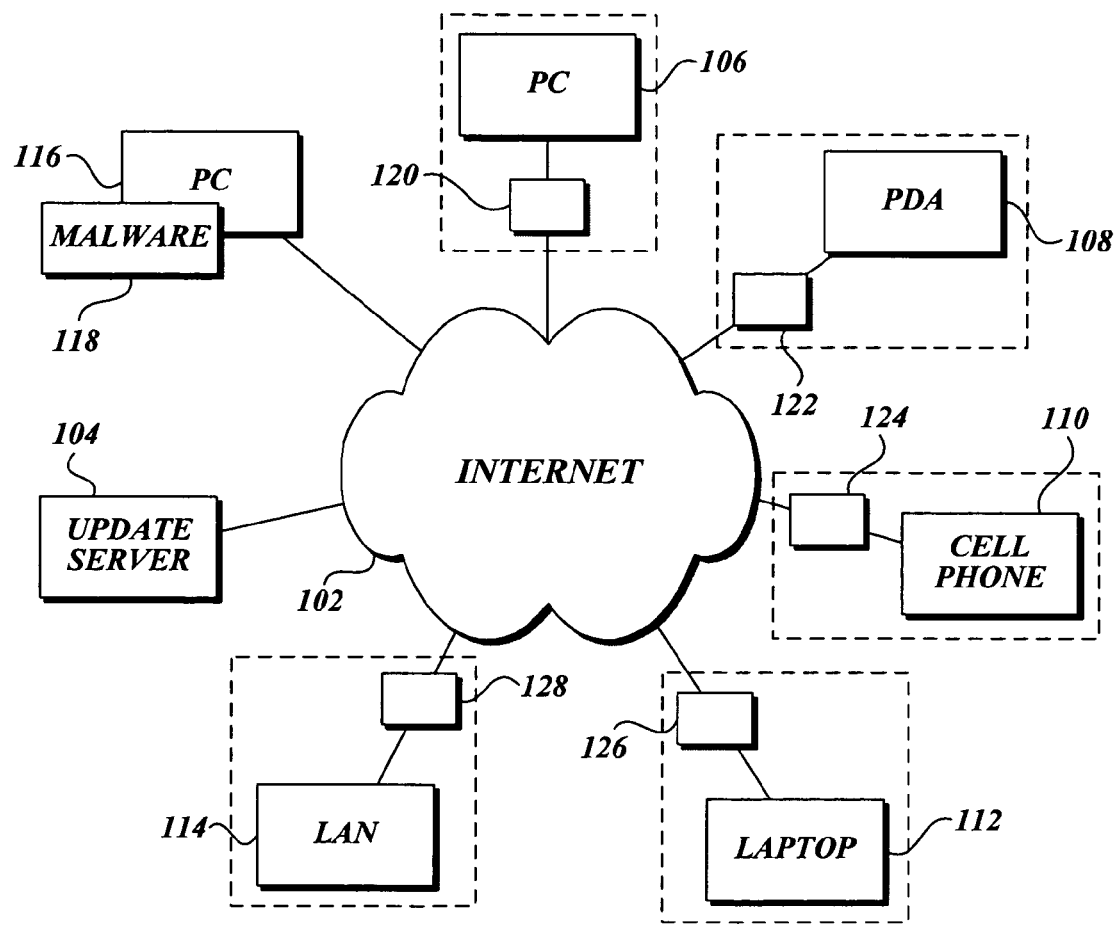
FIG. 3 is a pictorial diagram illustrating a representative network environment showing individual computer systems each having a dynamic protection module to protect against malware according to the present invention.

FIG. 3 is a pictorial diagram illustrating a representative network environment suitable for implementing the present invention. The representative network environment is typically connected to various computer systems, anyone of which may be protected in accordance with the present invention. Representative computer systems that may be protected in accordance with the invention include, not are not limited to, anyone of a personal computer 106, a personal digital assistant (PDA) 108, a cellular phone 110, a laptop computer 112, and a local area network (LAN) 114. Each of the computer systems 106 through 114 is communicatively connected to a network 102, such as the Internet. It should be noted that while the present invention is generally described in terms of operating in conjunction with a computer system, it is for illustration purposes only, and should not be construed as limiting upon the present invention. Those skilled in the art will readily recognize that almost any networked computing system may be vulnerable to an attack by malware. Accordingly, the present invention may be advantageously implemented to protect numerous types of computers, computing devices, or computing systems including, but not limited to, personal computers, tablet computers, notebook computers, personal digital assistants (PDAs), mini- and mainframe computers, wireless phones (frequently referred to as cell phones), hybrid computing devices such as wireless phone/PDA combinations, and the like, as well as any local area network computing systems. The present invention may also be advantageously implemented to protect hardware devices, peripheral devices, software applications, device drivers, operating systems, and the like.

It should be appreciated that the network 102 may include any number of actual communication networks. These actual communication networks include, but are not limited to, the Internet, wide and local area networks, intranets, cellular networks, and the like. Accordingly, while the present invention may be discussed in terms of a computer network, and in particular the Internet, it is for illustration purposes only, and should not be construed as limiting upon the present invention.

Still referring to FIG. 3, in addition to connecting to a plurality of computer systems 106, 108, 110, 112, and 114, the network 102 may also be connected to the update server 104. Although not intended to be limiting of the invention, the update server 104 is shown configured to communicate with the computer systems 106-114 over the Internet 102. Alternatively, the update server 104 may be configured to communicate with any computer systems via an internal network that may be implemented as a local area network (LAN), wide area network (WAN) or even a direct communication link. In general, the update server 104 acts as a distribution point for software updates (patches) that are made available from an operating system provider, anti-virus software provider, and the like. Also, as is readily appreciated by those skilled in the art, the update server 104 allows a system administrator to customize how software updates will be installed on the computer systems. For example, the update server 104 may be configured to perform installations at predetermined periods of time, thereby minimizing inconvenience to the computer system users. Additionally, some types of software updates may be assigned a higher priority than other software updates. Consequently, those updates assigned the highest priority are installed first. For example, software updates for protection against known viruses may be assigned a higher priority level than updates for repair of vulnerabilities with no known viruses that exploit the vulnerability. Therefore, when a software update becomes available, the update server 104 may suspend installation of a lower priority software update until installation of the higher priority software update is complete. The highest priority updates may be referred to generally as "critical" updates. The use of an update server, such as update server 104, communicatively connected to the Internet 102 from which a computing system can communicate with and receive updates, such as patches, is described in the commonly assigned U.S. patent application Ser. No. 10/966,621, filed Oct. 14, 2004, fully incorporated herein expressly by reference.

For illustration purposes, FIG. 3 is shown to include personal computer 116 also communicatively connected to the Internet 102. Personal computer 116 is representative of a malicious user who may release malware 118 onto the Internet 102. The present invention prevents malware 118 from infecting any one or more of the computer systems 106-114.

Still referring to FIG. 3, each of the computer systems 106, 108, 110, 112, and 114 may include a "dynamic protection" module in accordance with the present invention, to prevent the computer system during state changes that may result in the reopening of a once closed vulnerability window. Personal computer 106 includes dynamic protection module 120. Personal digital assistant 108 includes dynamic protection module 122. Cellular phone 110 includes dynamic protection module 124. Laptop computer 112 includes dynamic protection module 126. Local area network 114 includes dynamic protection module 128. It is to be understood by those skilled in the art that the dynamic protection module in accordance with the invention, can be a discrete component which physically resides outside of the computer system to be protected by it, or alternatively, the dynamic protection module can be implemented within the individual computer system. According to other embodiments, the dynamic protection module may be implemented as software, or logic, within one or more components of the computer system. In further alternative embodiments, the dynamic protection module may be implemented as one or more software modules operating in conjunction with, or as part of, the operating system, or as a separate application installed on the computer system. Accordingly, the dynamic protection module should not be construed as limited to any particular embodiment.

Figure 4:
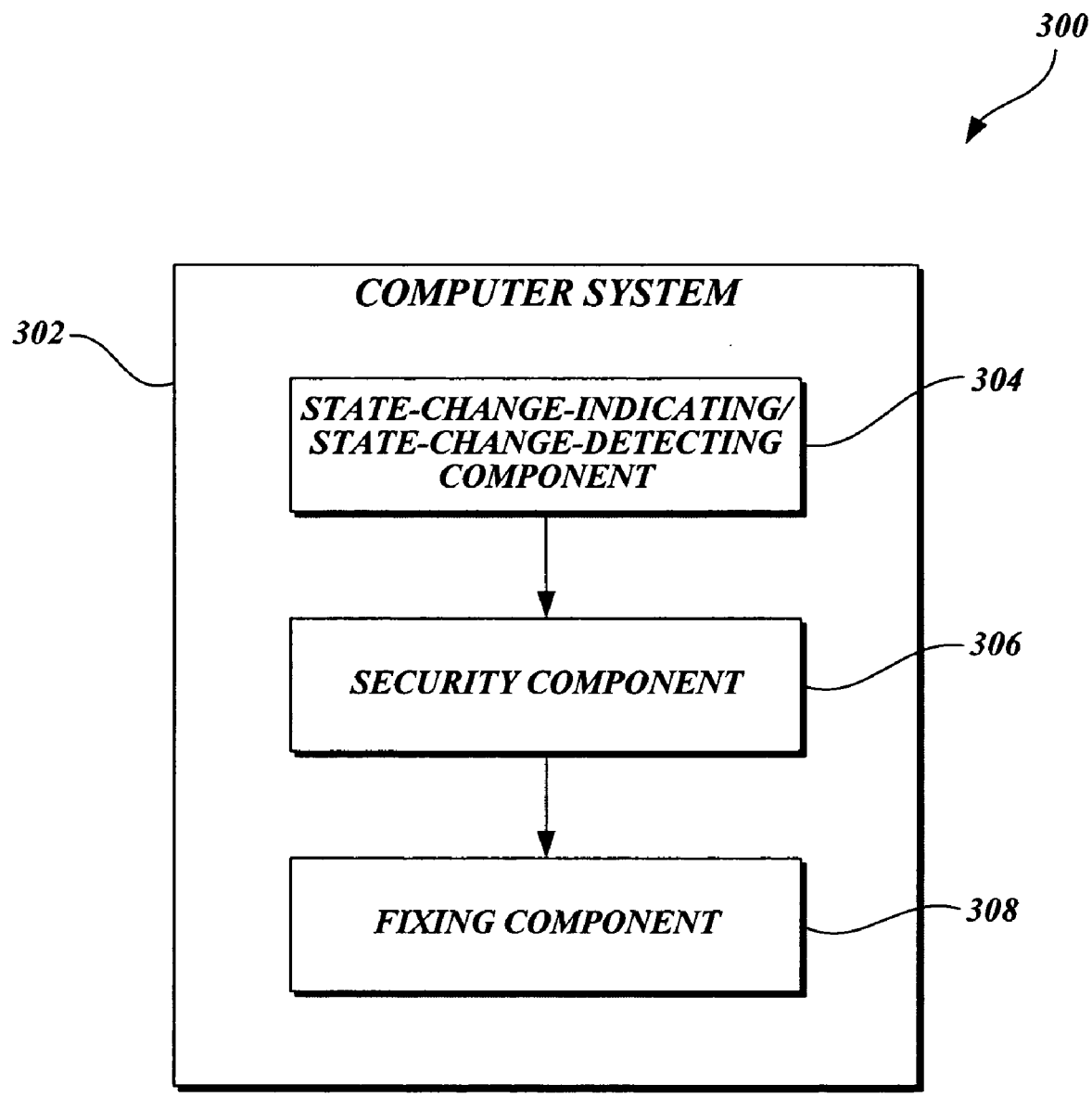
FIG. 4 is a pictorial diagram illustrating the components of one embodiment of a dynamic protection module for a computer system according to the present invention.

Referring now to FIG. 4, a representative computer system 300 is shown including one configuration of a dynamic protection module 302 having three components that combined result in the dynamic protection module 302 in accordance with the invention. One embodiment of a computer system in accordance with the present invention includes at least a state change indicating component 304, a security component 306, and a fixing component 308. Each of the components 304, 306, and 308 may be communicatively connected to each other, to any other computer system components (not shown), and may also be communicatively connected to the network 102 of FIG. 3. In another embodiment, the state-change-indicating component 304, may be replaced with a component or module that detects a change in state of the computer.

As explained in the Background of the Invention section above, a computer system can be fully updated to include all available updates. However, certain events or activities may transpire that may result in a change to the computer system state corresponding to a state when the computer system is not fully updated with all available updates that may result in reopening a vulnerability window, therefore rendering the computer system susceptible to a renewed attack. A "computer system state" or simply "state," as used herein, refers to the computer system's software condition. A state change, therefore, refers to modification of the computer system's software that may occur on certain events, for example, upgrades to an operating system, installing new software or reinstalling a newer version of software, rebooting the computer system, or the use of a computer system restore state rollback functionality. A state change may have the potential to revert a computer system state to a previous condition. However, not all state changes may result in placing the computer system at risk. It is possible, the state change may only result in placing the computer system to a different or unknown state, but may nevertheless still be a fully protected state. However, neither the user nor the computer system may know ahead of time whether the state being entered will be a vulnerable state or a secure, protected state. Accordingly, because of the uncertainty of state changing processes, the present invention provides a security measure to protect the computer system in the event that the state change does result in the opening of a vulnerability window. In accordance with the invention, before, simultaneously with, or after a state change has been indicated, detected, or discovered, for example, by the state-change-indicating component 304, the security component 306 raises the security level, placing the computer system in a temporary "isolated" mode, which may include blocking all incoming network traffic other than information requested by the computer system or coming from a secure or a known location. Then, on successful completion of a fixing routine by the fixing component 308, which may include determining that the required updates have been installed, the security level is returned to a normal mode by the security component 306. Thus, in accordance with the present invention, a computer system is protected during state changes.

One example of a state change includes the use of the System Restore feature of Microsoft® Windows® XP. When a user downloads or installs a new application or software version, there are changes that occur to the computer system that can render the system unstable. The user is faced with the choice of having an unstable computer system or the user may opt to restore the computer system to a working state. The user typically will prefer to have a working system rather than an unstable one. The System Restore feature of Microsoft® Windows® XP may be used to remove any system changes that were made since a previous point in time, including the possible removal of some updates, thus opening a vulnerability window. In Microsoft® Windows® XP, the computer system periodically records a snapshot of the computer system state. These snapshots are called restore points. The Microsoft® Windows® XP operating system also creates restore points at the time of significant system events (such as when an application or driver is installed). Additionally, Microsoft® Windows® XP provides the user the ability to create restore points at any time. If the computer system user installs a program that makes the computer unstable, the computer user can request the use of the System Restore feature, choose a restore point, and return the computer system to a previously known stable state. However, unknowingly, the computer system user may return the computer system to a point in time when a vulnerability window is open. Nevertheless, the computer system user prefers to be in an open vulnerability window rather than have a nonfunctioning, unstable computer system. Similarly, and for other reasons, there are other situations that may require the computer system to return to a previous state that may not include the previously installed protection updates.

In the above examples of a computer system state change, a state-change-indicating component 304 in accordance with the present invention can set a "flag." A flag is a marker of some type, used by the computer system in processing or interpreting information that is set, for example, in the computer system's registry, or in a database, used to store information, settings, options, and preferences regarding the operation of the computer system, which computer system software may reference. The use of the example of setting a flag within the registry of the computer system to indicate an imminent state change, a currently occurring state change, or the past occurrence of a state change should not be viewed as limiting of the invention. The person skilled in the art can visualize alternative methods of indicating a state change, such as through the use of a set of application programming interfaces (API's). The function of the state change indicating component 304 is to indicate a software state change is about to occur, is occurring, or has recently occurred. Preferably, an indication is set prior to a state change in order to provide a higher security level that prevents even a small or instant reopening of a vulnerability window. In addition to system restore, other instances when a computer system undergoes a state change may include installing new software, reinstalling an application or rebooting a computer system. In accordance with the present invention, during any one of these processes, the fixing component 308 may read the registry flag and signal the security component 306 to place the computer system in isolated mode.

Furthermore, because state changes are inherently discoverable, it may be possible for a detection module to detect that a state change has occurred without the setting of a special flag or the addition of an explicit change indicating component.

The security component 306 is interposed between a computer system and the network and, as such, all network traffic from the network to a computer system preferably flows through the security component 306. The security component 306 may be interposed between the computer system and the network, either physically, as hardware, or logically, as software, or a combination of both. A representative security component 306 that may be used in accordance with the invention to protect the computer system in the event of a state change is a hardware or software firewall, or a combination of both. As those skilled in the art will recognize, a firewall is a security system that protects an internal network or other computer systems from unauthorized access originating from an external network by controlling the flow of information from the external network to the computer system. All communications originating outside of the firewall are first examined, and a determination is made whether the communication is safe or permissible to forward to the intended computer.

In accordance with the present invention, the security component 306 may be in an isolated mode or a normal mode. Isolated mode refers to a security level that protects the computer system from an open vulnerability window during a state change. Normal mode refers to the security level that was in effect prior to entering the isolated mode. In isolated mode, the security component 306 may have implemented more stringent security restrictions than in normal mode.

For a given computer system, the security component 306 may have any number of configurations that the security component 306 may impose. Based on the computer system's particular configuration, protective security measures in the normal mode may include any number of network activity controls, or combinations thereof, including, but not limited to: blocking network traffic on specific communication ports and addresses; blocking communications to and/or from certain network-related applications, such as an e-mail or Web browser application; and blocking access to particular hardware or software components on the computer system. The isolated mode is more restrictive than normal mode. As such, based on the computer system's particular configuration, protective security measures in the isolated mode may include any of the controls mentioned in connection with normal mode, but additionally including blocking all network communications between the computer system and the network, except communications between known, or secure network locations, and also excepting communications or information such as to and from the update server 104 for installing patches or updates. According to one embodiment of the invention, therefore, isolated mode refers to the blocking of all communications to and or from the network 102, other than those communications required for successfully completing the fixing routine by fixing component 308. Either the computer system user or a system administrator can have access to set the appropriate security measures. Generally, it is envisioned that the security component 306 has a default condition, which may be modified by a user or system administrator. If a system administrator modifies the controls, the security component 306 will implement the controls according to the system administrator.

In accordance with one embodiment of the invention, the security component 306 may have a user interface associated therewith to provide the user with an indication of the level of restrictions that are implemented by the security component 306. This visual indication may be especially useful when a user is trying to determine whether a network connection is malfunctioning or that network activity is restricted due to a current security threat. The security component 306 may operate in an automatic manner, i.e., requiring little to no user intervention, and any corresponding visual representations of the security level, can be mainly for user information purposes.

According to another embodiment of the present invention, if the security component 306 places the computer system in isolated mode, the user may be provided with the option to disable the isolated mode and return to normal mode. This is useful as there are certain times that the necessity of full access to a network outweighs the risk of a potentially open vulnerability window. For example, it may be necessary to disable the security component 306 when attempting to diagnose networking problems or issues. Alternatively, some emergency situations, such as using 911 voiceover IP service may necessitate the security component 306 to continue operating in the normal, not isolated mode. It is intended that isolated mode be only a transient condition for security component 306, while the fixing component 308 undertakes to successfully complete the fixing routine that may include bringing a potentially open vulnerability window to a close.

In accordance with one embodiment of the present invention, the fixing component 308 may continuously poll the registry for a flag set in the registry that indicates an imminent state change that will cause the fixing component 308 to signal the security component 306 to place the computer system in the isolated mode. Alternatively, the security component 306 may poll the registry.

Figure 1:
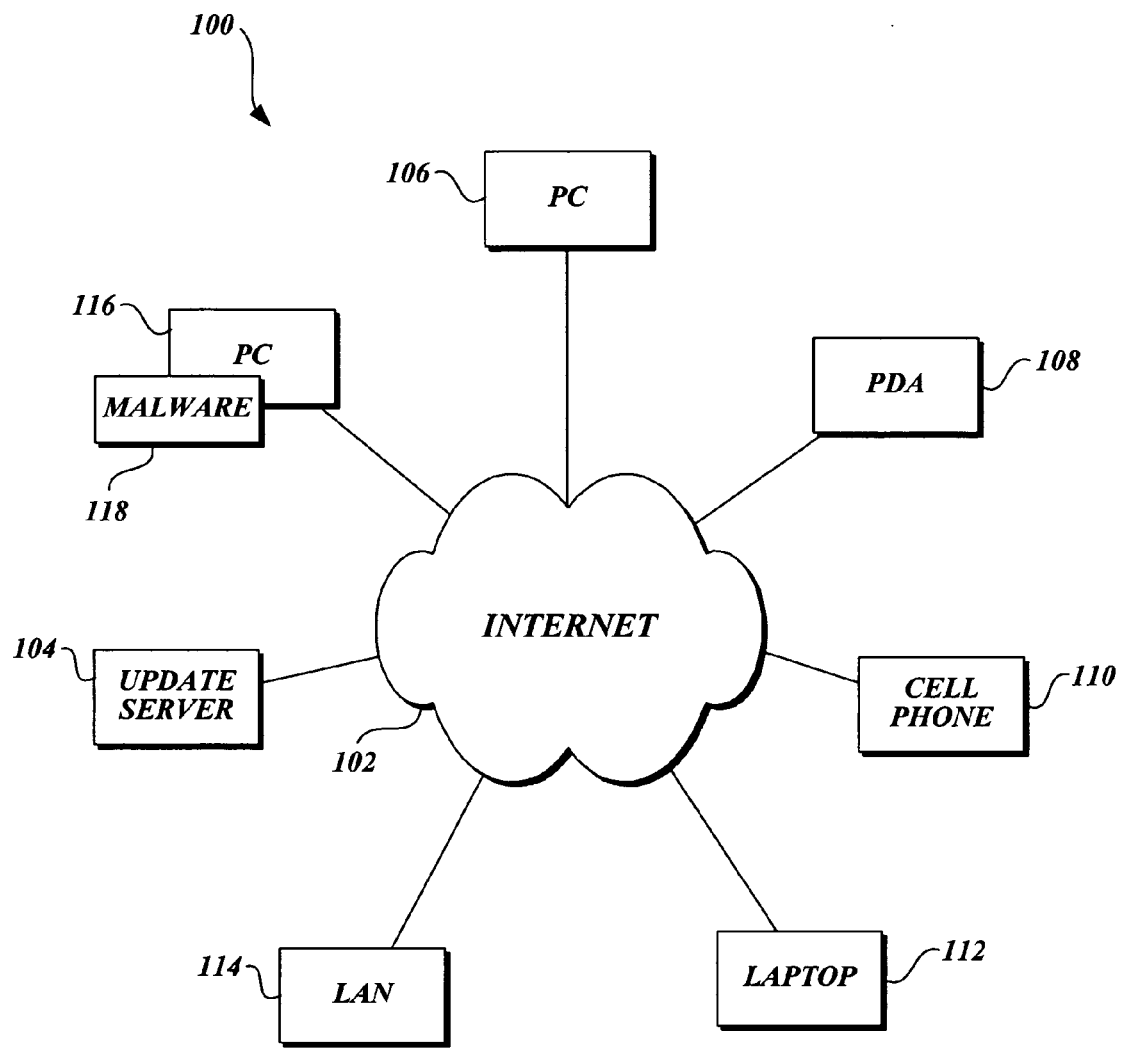
FIG. 1 is a pictorial diagram illustrating a conventional network environment, over which malware is commonly distributed.
Figure 2A:
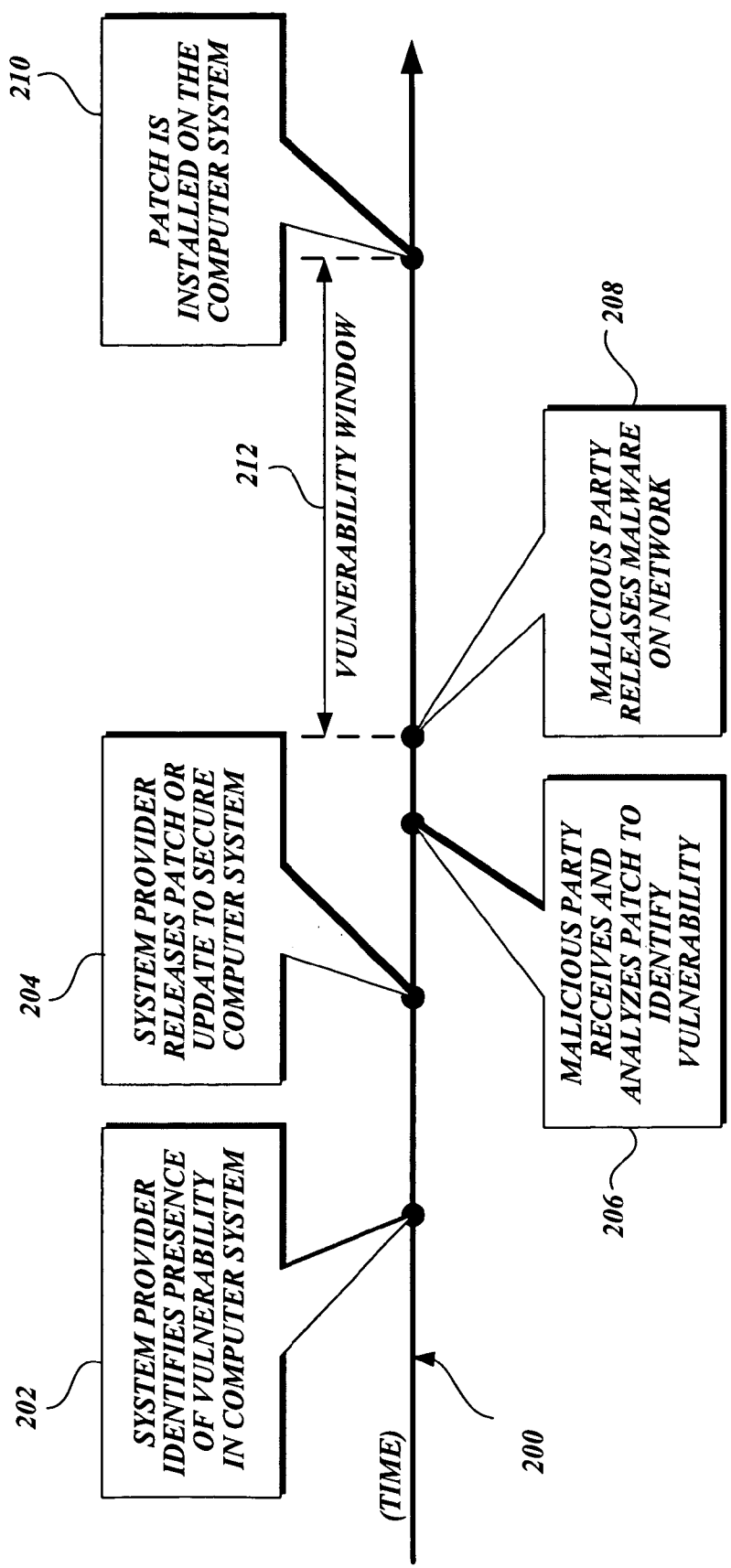
FIGS. 2A-2C are block diagrams illustrating exemplary timelines demonstrating different vulnerability windows of computer systems.
Figure 2B:
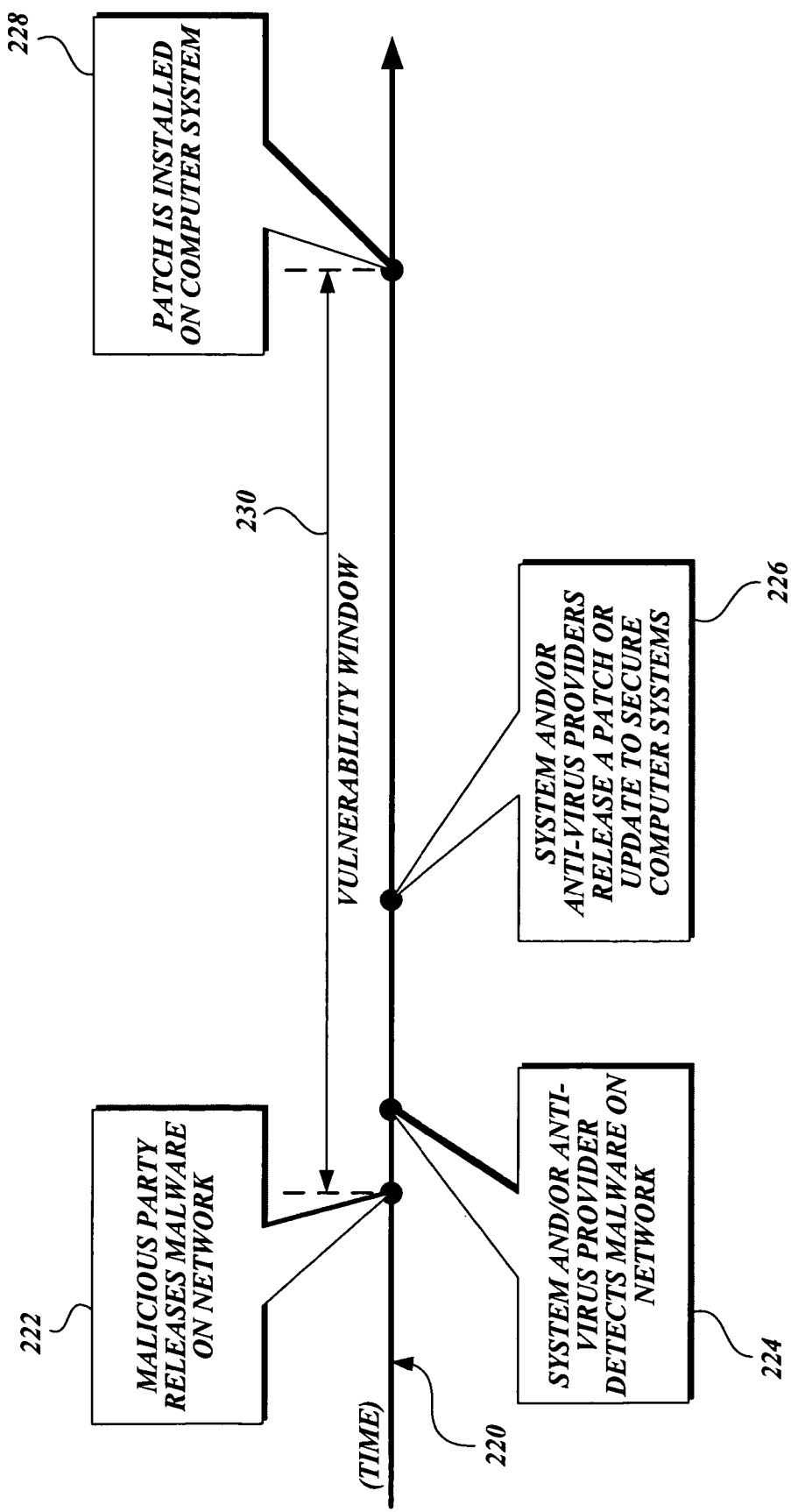
Figure 2C:
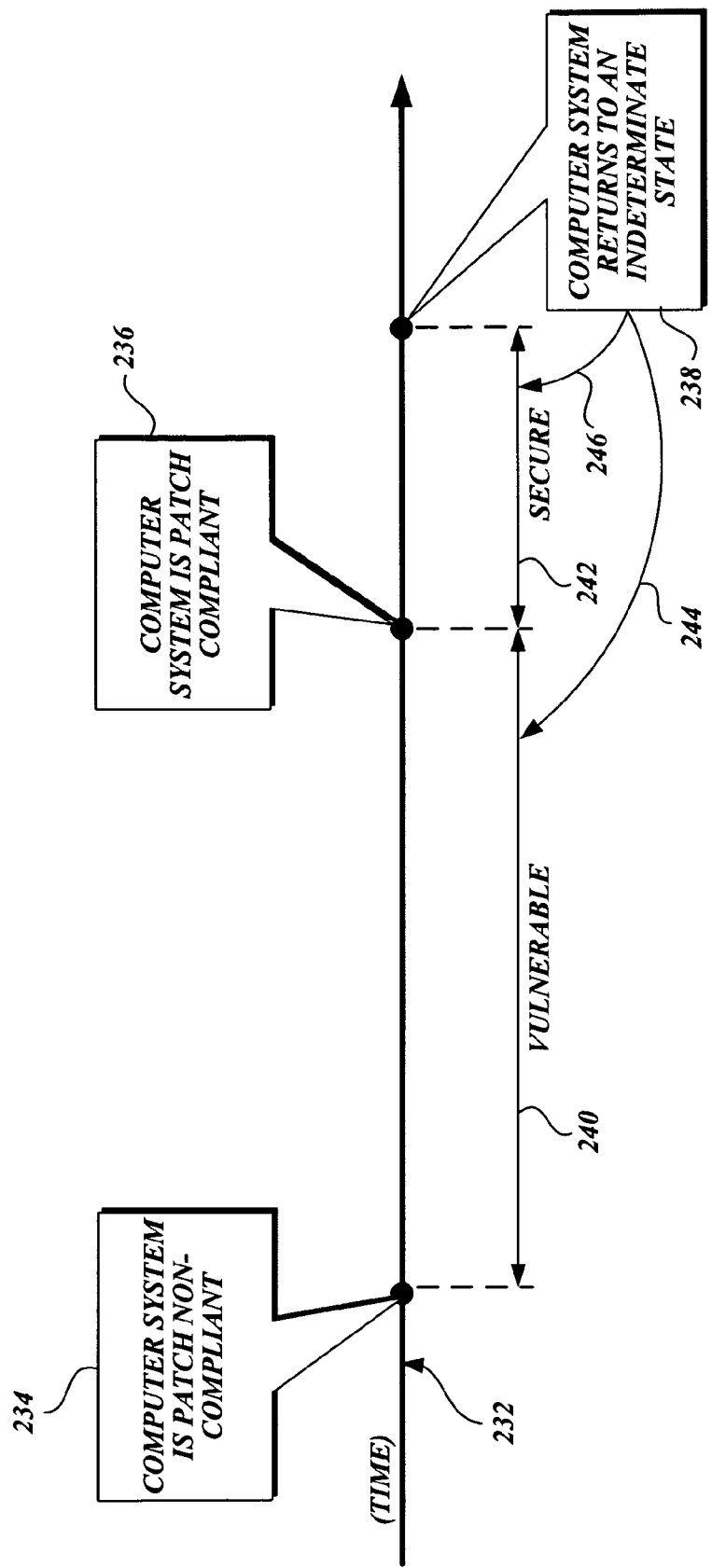

The fixing routine of the fixing component 308 is multi-fold, and may include determining what action needs to be taken, completing the action, and determining whether the computer system state warrants lowering the security level from isolated mode to normal mode. Successful completion of the fixing routine, therefore, is dependent on whether the state change does, in fact, result in reopening a previously closed vulnerability window, such as under the set of conditions leading to scenario 244 in FIG. 2C, or whether the computer system returns to a secure condition under the set of conditions leading to scenario 246, wherein the computer system is fully patch compliant. Alternatively, a third situation may exist wherein the computer system is, in fact, in an open vulnerability window, but the vulnerability window was never closed. This situation may be represented on timeline 232 of FIG. 2C by event 238 occurring after patch non-compliant event 234, but before patch compliant event 236. A fourth situation may exist wherein there was never an open vulnerability window. This fourth situation may be represented on timeline 232 by event 238 occurring before both events 234 and 236.

As part of the fixing routine, the fixing component 308 may be configured to identify the software state of the computer system by performing an analysis of configuration databases stored on the computer system. As known to those skilled in the art and others, computer systems maintain databases from which configuration information may be obtained. For example, the system registry is a database used to store settings, options, and preferences regarding the operation of a computer system. The fixing component 308 may analyze the system registry and other configuration databases to identify the software updates installed on the computer system. The fixing component 308 can then query a catalog database for information about available software updates and rules that govern how a particular software update is installed.

The fixing component 308 may be configured to parse configuration databases like the system registry and identify the exact version of the software updates already installed on the computer system. After the software state of the computer system is known, the fixing component 308 is able to determine the software updates that need to be installed on the computer system. The fixing component 308 may have access to a database of all available updates, which may be segmented into critical updates, and non-critical updates. The fixing component 308 can make a comparison of the installed updates and the available updates from the database, and can request the critical updates, which are missing, first. The fixing component 308 assembles the data known about the computer system and transmits the data to the update server 104 via the network 102, such as the Internet.

In general, the update server 104 acts as a distribution point for software updates. The update server 104 allows a system administrator to customize how software updates will be installed on computer systems connected to the Internet 102. For example, the update server 104 may be configured to perform installations at predetermined periods of time, thereby minimizing inconvenience to users. Alternatively, the fixing component 308 may request installation of updates. Preferably, to minimize the amount of time that the computer system is in the isolated mode, the fixing component 308 may request the critical updates first. Once the critical updates have been installed, the computer system may be taken out of the isolated mode and returned to the normal mode. For example, software updates to antivirus software may be assigned a relatively high priority level. In this instance, when a request for a software update for antivirus software is received, the update server 104 may suspend installation of a lower priority software update until installation of the higher priority software update is completed.

The update server 104 can maintain a software distribution module configured to transmit software updates to the computer systems where the software updates will be installed. To transmit the software updates, the update server can use network protocols generally known in the art, such as file transfer protocol (FTP), or HyperText Transfer Protocol (HTTP). As illustrated in FIG. 4, each component of the dynamic protection module, e.g., the state-change-indicating component 304, the fixing component 308, and the security component 306 are interconnected and able to communicate with each other and with other components not shown. The fixing component 308 can determine which updates are currently installed on the computer system, which updates are not installed on the computer system by comparing the installed updates to a database of all available updates, and whether the fixing component 308 can install or has installed the missing updates.

The fixing component 308 may, therefore, perform one or more routines for: monitoring for a flag indicating a state change; detecting a state change; scanning configuration databases, like the registry, for the current configuration for the computer system regarding updates; issuing instructions to the security component 306 to place the computer system in isolated mode; issuing instructions to install available, but not currently installed updates; determining successful completion, such as when critical updates have been installed; and notifying the security component 306 when to take the computer system from isolated mode to normal mode.

Figure 8:
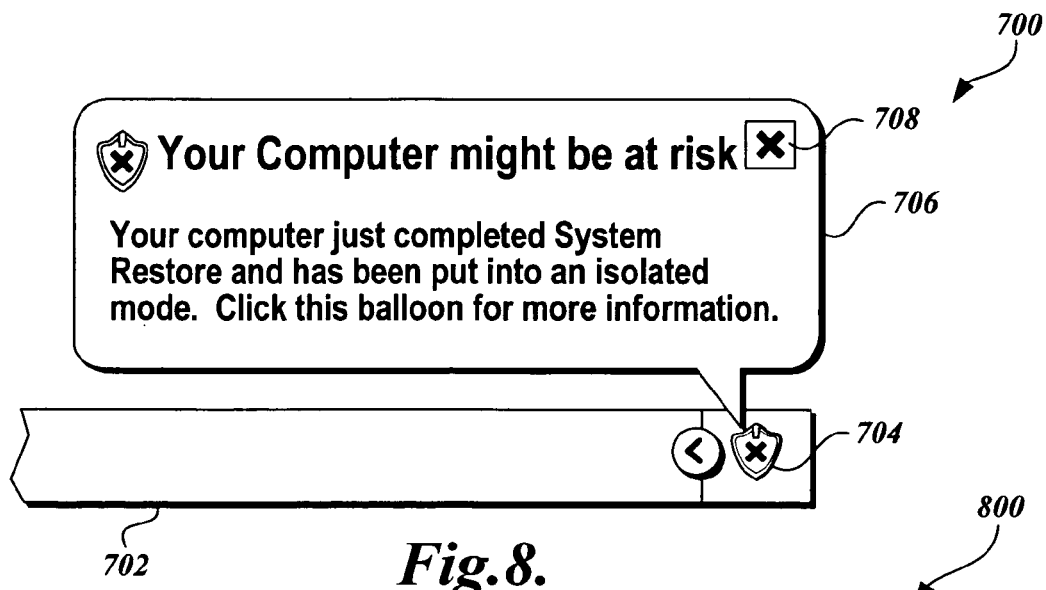
FIG. 8 is a pictorial diagram illustrating a dialog box that may alert the computer system user that the computer system has been placed into an isolated mode for the protection of a computer system that is about to undergo a computer system state change according to the present invention.
Figure 9:
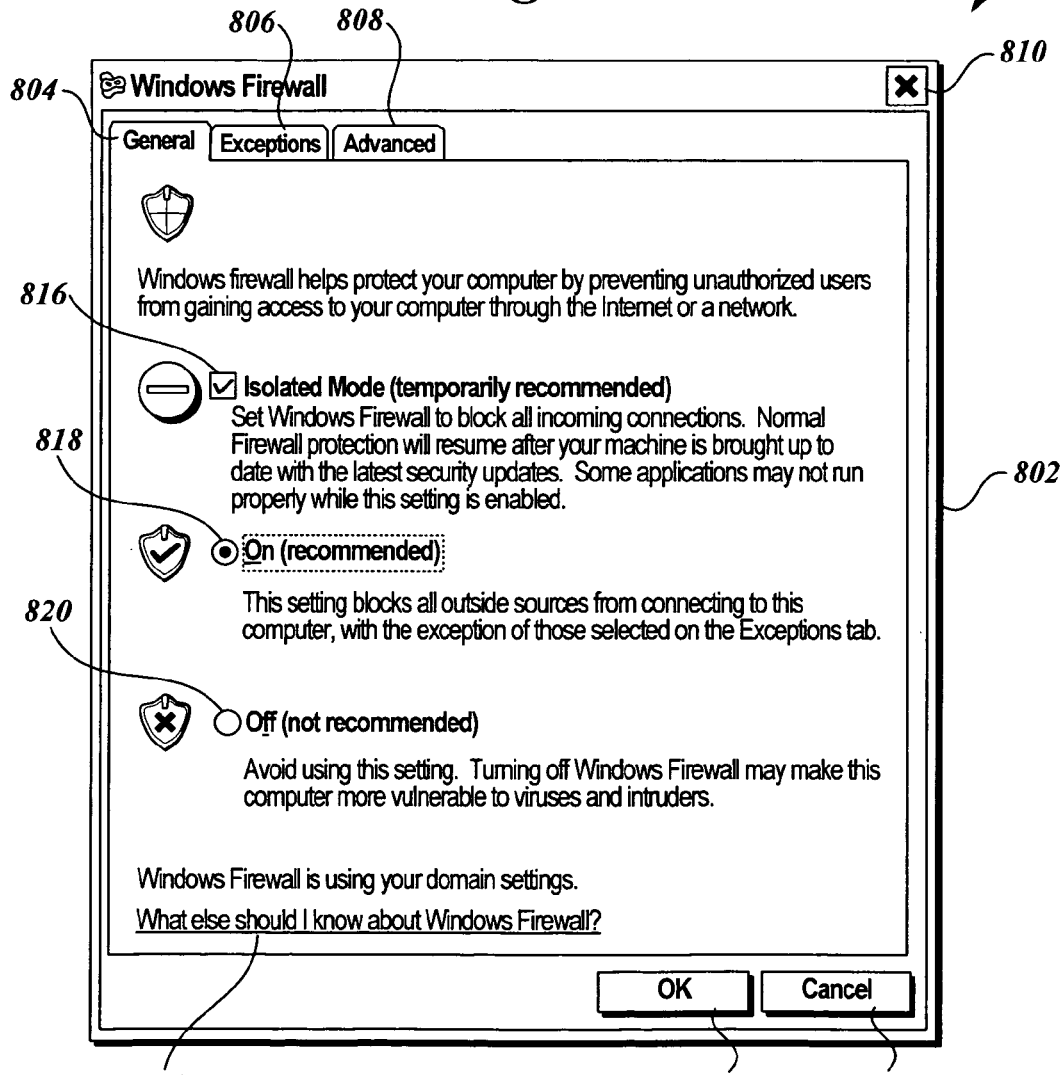
FIG. 9 is a pictorial diagram illustrating a window to allow a computer system user to configure a security component according to the present invention.

In accordance with one embodiment of the present invention, the security component 306 does not request information from the fixing component 308. Instead, the security component 306 operates on information transmitted to it from the fixing component 308 in connection with certain events. Alternatively, the security component 306 may continuously monitor the registry for a flag indicating an imminent state change. Upon recognition of a flag indicating a state change, the security component 306 raises the security level from a "normal" level to an "isolated" level. As used herein, an isolated security level may include blocking all incoming network traffic, other than information that may be requested by the fixing component 308 or information coming from a secure or a known location. A user or administrator may be given the option of changing the security measures before, during, or after the state change. A normal security level refers to the security settings that were in effect prior to the computer system being placed in isolated mode. The normal settings may be configured by the computer system user or the settings may be provided by a system administrator. The security component's security settings may be adjusted through a user interface, such as a Graphical User Interface (GUI), illustrated in FIG. 9. Additionally, once the security component 306 has raised the security level, the user may be made aware of this fact, and give the user the opportunity to return to the normal security level, on sufficient information about the risks to the user, such as by providing a dialog box as illustrated in FIG. 8.

Figure 5:
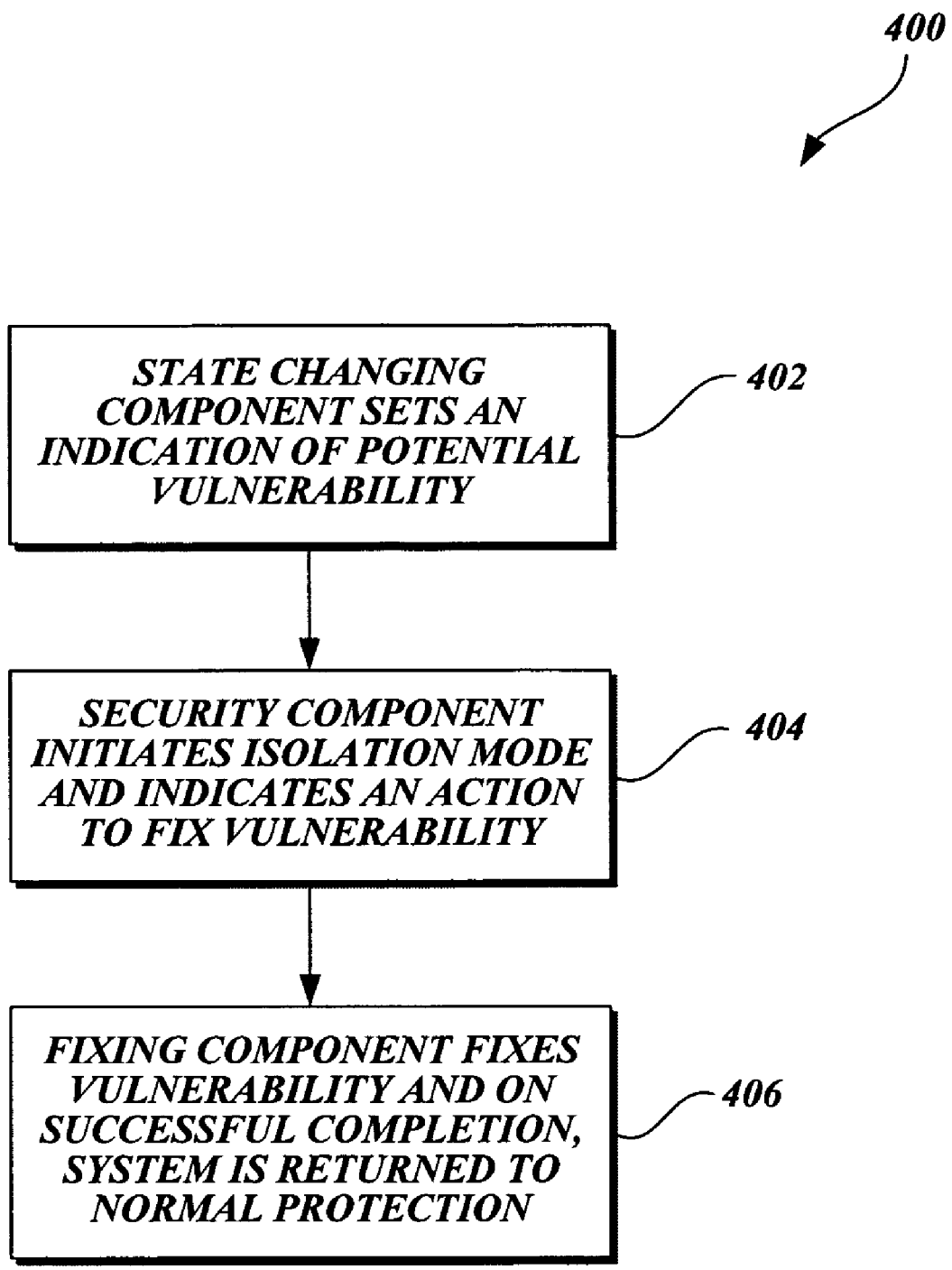
FIG. 5 is a flow diagram of one embodiment of a method for dynamically protecting computer systems possibly vulnerable to malware during a state change event according to the present invention.

Referring now to FIG. 5, and as discussed above, one embodiment of the present invention relates to a method for securing a computer system from attack over a communication network. The method 400, includes a state changing component setting an indication of a potential vulnerability in block 402. In block 404, a security component initiates isolation mode and indicates an action to fix any vulnerabilities. Finally, in block 406, a fixing component fixes any vulnerabilities and on successful completion, the computer system is returned to normal protection. Alternatively, no explicit indication is necessary to be set in block 402, since the state change itself may be discoverable.

Figure 6:
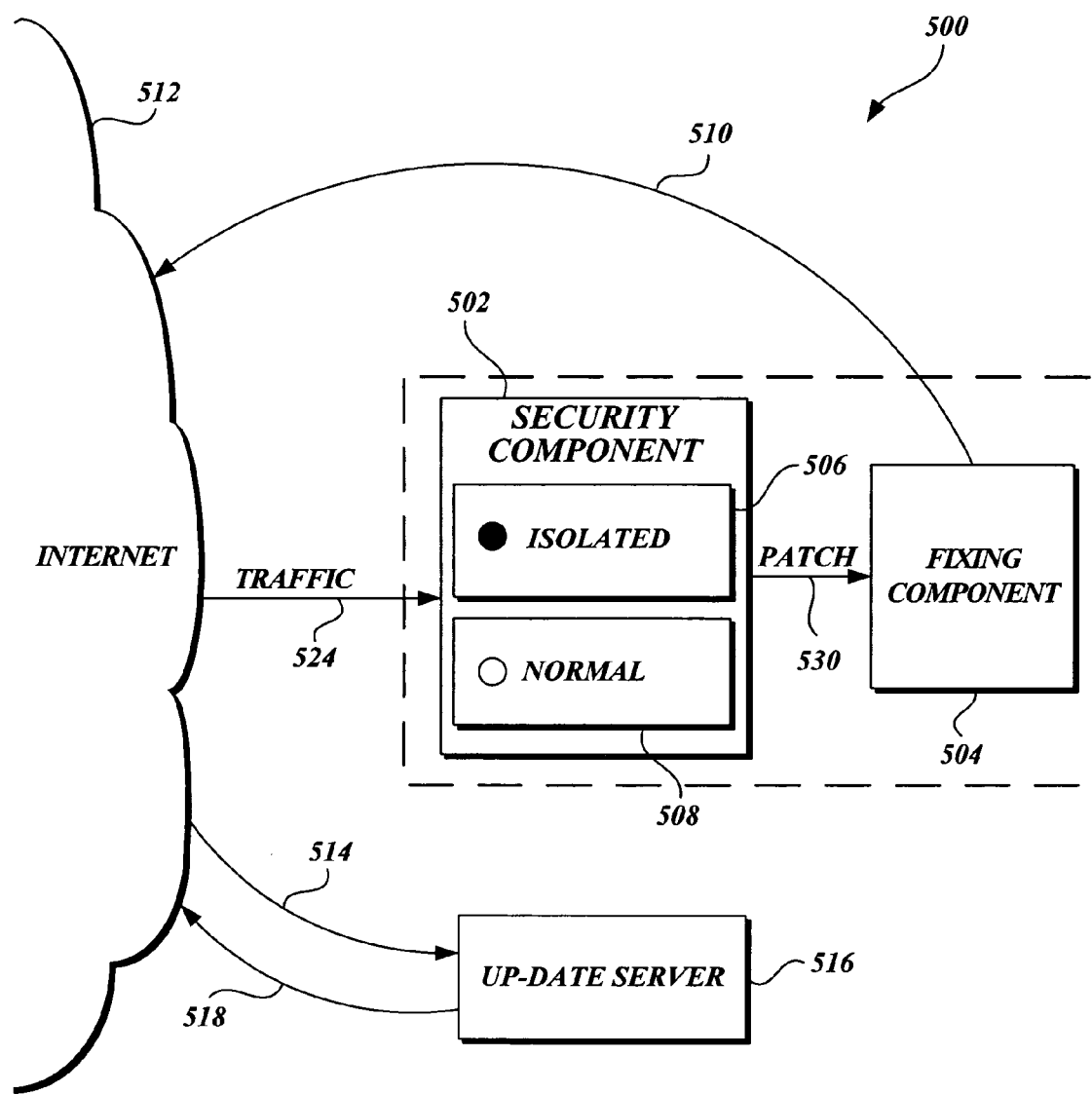
FIG. 6 is a pictorial diagram illustrating a representative operation of a computer system security component, update component, and fixing component according to the present invention.

Referring now to FIG. 6, a representative schematic diagram illustrating one configuration of a fixing component 504, security component 502 and up-date server 516, connected to the Internet 512, is provided. The fixing component 504 issues an update request 510 via the Internet 512 to an update server 516, which is transmitted to the update server 516 via communications 514. The update server 516 which is also communicatively connected to the Internet 512 responds via communications 518. Internet traffic 524 must pass through the security component 502. As shown, the security component 502 has an isolated mode 506 and a normal mode 508. The security component 502 is placed in the isolated mode 506. In the isolated mode 506, the security component 502 blocks all incoming Internet traffic 524, but allows critical patch 530 to pass through. Accordingly, before the computer system undergoes a state change that may place the computer system vulnerable to attacks, the computer system security component 502 raises the security level to isolated 506. Fixing component 504 and update server 516 can communicate with each other via the Internet 512 in any manner, or in any sequence of steps, to determine whether the fixing component 504 has successfully completed its task of determining whether to return the security component 502 from the isolated security mode 506 to the normal security mode 508. After successfully completing the fixing routine, the fixing component 504 can issue instructions to the security component 502 to return to normal mode 508 from isolated mode 506. Alternatively, the security component 502 can continuously poll the fixing component 504 to determine whether fixing component 504 has successfully completed its task.

Figure 7:
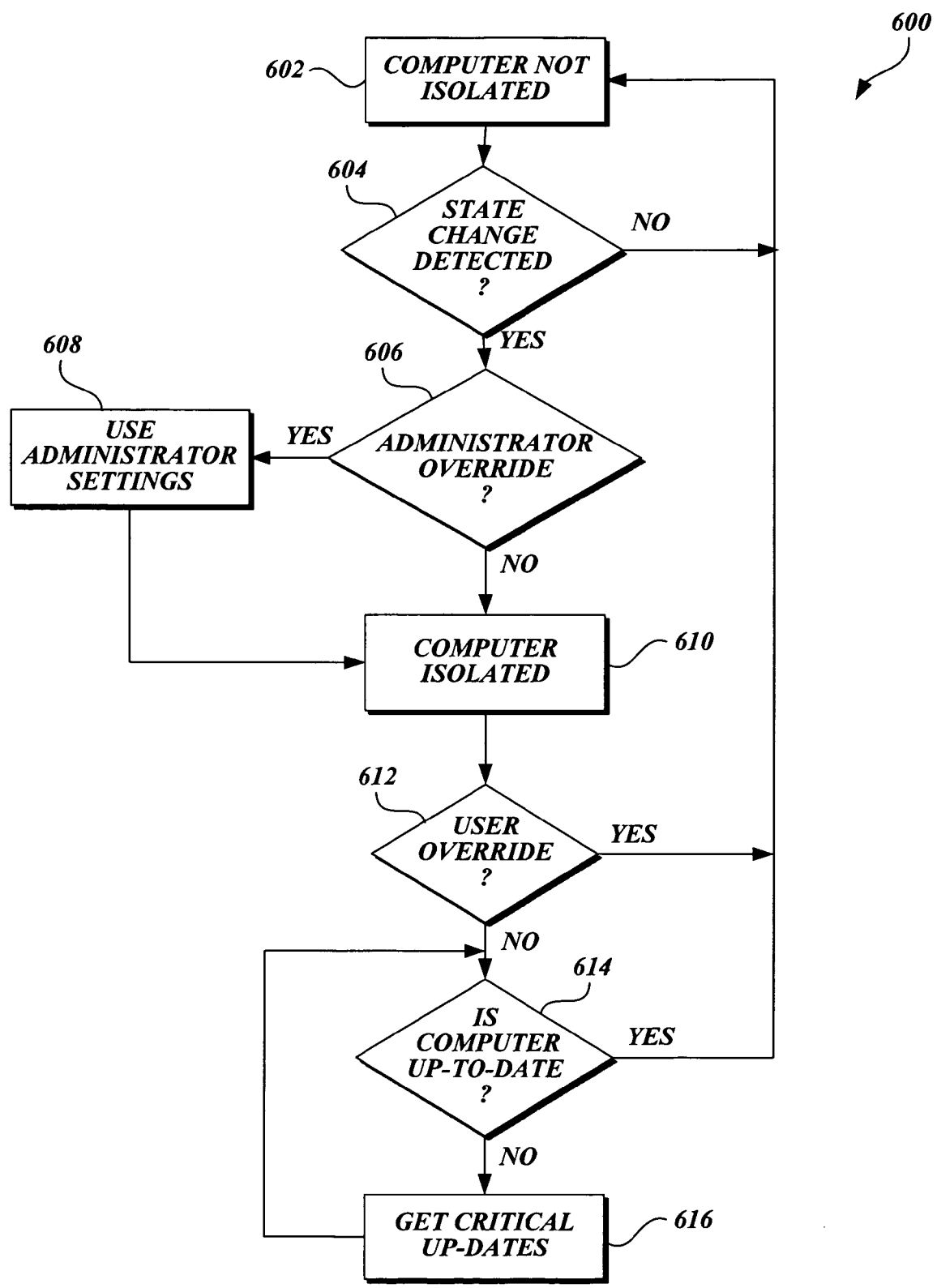
FIG. 7 is a flow diagram illustrating one embodiment of a method implemented by a computer system for dynamically protecting a computer system in the event of a computer system state change according to the present invention.

Referring now to FIG. 7, a flow diagram illustrating one representative embodiment of a dynamic protection method 600, in accordance with the present invention, is provided. In summary, the method 600 sets an indication of and/or detects a computer system state change and a potential vulnerability, a security component isolates the computer system from all communications received from a network, other than communications necessary for the successful completion of fixing the vulnerability. Finally, on successfully completing the fixing routine, the computer system is returned to normal security level protection.

At block 602, the computer system is not isolated prior to a state change. The computer system is protected according to the normal security level settings. At block 604, a test is made to detect a state change, for example, by continually monitoring for an indication, such as a flag, of an imminent software state change that may result in the opening of a vulnerability window. The monitoring can be substantially continuous, or the monitoring can occur at a frequent and regular interval. While no state change is detected in block 604, the computer system remains not isolated in block 602. On detection of a state change, the dynamic protection method 600 determines in block 606 whether the system administrator has provided an override to the default security level settings for isolated mode. If the administrator has not overridden the default isolated mode settings, the computer system is isolated in block 610 with the current default isolated mode settings. However, if the administrator has overridden the default isolated security settings, the method reads the administrator security settings in block 608 and places the computer system in the computer isolated mode 610, with the settings provided by the system administrator in block 608.

While the computer system is in the isolated mode in block 610, the computer system is capable of determining whether the user has overridden isolated mode in block 612. User override means that the user has decided, for whatever purposes, that the computer system should not be in the isolated mode. Therefore, the user override returns the computer system to the not isolated mode in block 602. If, however, the user does not override isolated mode, the method 600 determines whether a fixing routine has been successfully completed in block 614, such as by fully updating the computer system with critical updates. As discussed previously, successful completion can be one of several outcomes. For example, the computer system can determine that there are no possible updates to install. Accordingly, the computer system is taken out of isolated mode and returned to not isolated mode, block 602. Alternatively, the computer system can determine that the computer system is, and always was, fully updated. Accordingly, there are no updates to be installed, and the computer system is returned to the computer not isolated mode, block 602. Alternatively, the computer system can determine that although the computer system is vulnerable to one or more pieces of malware, there is no available update for a variety of reasons, and therefore, there is no purpose to remaining in the isolated mode. Alternatively, the computer system may determine that, in fact, the computer system is not fully updated, but for expediency, the computer system can request only those updates that are deemed to be critical. In this instance, the computer system will obtain the critical updates in block 616, such as from an update server connected to the Internet. Once the critical updates have been installed, the computer is up to date and the fixing routine has been successfully completed, and the computer system's security level returns to the not isolated mode, block 602.

Implementations of the present invention are not limited to the routine 600, shown in FIG. 7. Thus, the embodiment of the present invention described above in connection with FIG. 7 should be construed as exemplary and not limiting of the invention.

Referring to FIG. 8, a representative dialog box 700 is illustrated that may alert the computer system user that the computer system has been placed into an isolated mode for the protection of the computer system due to the computer system undergoing a state change, such as System Restore. Furthermore, the security component's security mode can by constantly monitored by locating an icon 704 on the taskbar 702 of a computer display. Icon 704 can take the form of a shield signifying protection or security. An "X" appearing in the center of the shield 704, can signify that the computer system is in the isolated mode. The dialog box 706 can contain an informational message to the user within the borders of the dialog box 706. Furthermore, the dialog box 706 can include a Close button 708. The user may locate a pointer over the Close button 708 and select to close the dialog box 706, such as by clicking a mouse button, with the pointer being located within the borders of the Close button 708. Alternatively, the user may select to view additional information by moving the pointer within the borders of the dialog box 706, and then clicking a mouse button with the pointer located within the borders of the dialog box 706, causing a user interface such as window 800 shown in FIG. 9, to appear.

As known to those skilled in the art, a graphical user interface or GUI is an input system characterized by the use of graphics on a computer display to communicate with a computer user. In this instance, the GUI is for a windowing environment. The window 802 includes a title bar with the title of "Windows Firewall." Thus, the user is made immediately aware that the window is specific to the firewall security system. The window 802 may provide information as well as configuration options to solicit input from the user. The window 802 can include a Close Window button 810 located in the upper right corner of window 802. Selecting the Close Window button 810 removes the window 802 from the computer display. The window 802 can include any number of tabs, such as tabs 804, 806, and 808; however, typically only one tab, tab 804, is displayed within the borders of the window 802, and the remaining tabs 806 and 808 are hidden from view, other than for a small portion of the tabs 806 and 808 used to select to view the contents of each respective tab. Tabs are generally placed near the upper portion of the window 802, below the title bar. In window 802, there is a General tab 804, an Exceptions tab 806, and an Advanced tab 808. Only the selections under the General tab 804 are shown. Under the General tab 804, the tab 804 includes information pertaining to the various security modes and provides options for selecting isolated mode by checking the check box 816. Additionally, the General tab 804 includes radio buttons 818 and 820. Selecting one radio button in a set deselects the previously selected button, so only one of the options in the set can be selected at any given time. Thus, upon selection of button 818, the button 820 is unselected and vice versa. Furthermore, beneath each radio button or check box that appears in the window 802, a sentence or two about the functionality and/or helpful information or recommendations can be provided for the user that allows the user to make a well-informed decision concerning the computer system's security measures. Radio button 820 turns off the firewall security. Radio button 818 turns on the firewall security. Additionally, the window 802 can include prompts for the user to request additional information, such as the prompt 822 to request further information about Windows® firewall.

The tab 806 may contain descriptions as well as provide the ability to select options of the exceptions that may be excluded from being blocked from the network when the firewall is on. For example, there may be a selection for excluding e-mail communications.

The advanced tab 808 includes features that a knowledgeable person may only be able to access. The advanced tab 808 may include system configurations for only the most knowledgeable persons familiar to computer systems and firewalls. If the user decides to make changes to the security firewall settings, the user can make the necessary selections by moving the pointer over the radio button or check box as appropriate. After making all selections, the user can then move the pointer over the OK button 812 and mouseclick on the OK button 812 to enter the changes. Otherwise, if the user wants to return to the previous settings, the user can move the pointer over the Cancel button 814, and mouseclick with the pointer located over the Cancel button 814, and the window 802 is closed.

While the preferred embodiment of the invention has been illustrated and described, it will be appreciated that various changes can be made therein without departing from the spirit and scope of the invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for protecting a computer system connected to a network, the computer system comprising a computing device, the system comprising:
   a security component interposed between a network and the computer system configured to raise a security level of the computer system to an elevated security level in response to detection of an imminent change of a state of the computer system, wherein the imminent change of the state is in response to detecting restoring the computer system to a previous state, and wherein a state change of the computer system may result in vulnerability of the computer system;
   a fixing component that is configured to, when the state change results in the vulnerability of the computer system, identify at least one software update to remedy the vulnerability of the computer system and request the at least one software update over the network, wherein, at the elevated security level, the security component limits access to the computer system over the network to only incoming network traffic providing the requested at least one software update; and
   one or more components configured to perform actions comprising:
      providing an indication to a user that the security level of the computer system has been raised to the elevated security level;
      determining whether user input is received instructing the computer system to exit the elevated security level prior to determining that the vulnerability of the computer system is remedied;
      when it is determined that the user input is not received:
         determining whether the vulnerability of the computer system is remedied; and
         exiting the elevated security level when it is determined that the vulnerability of the computer system is remedied; and
      when it is determined that the user input is received, exiting the elevated security level prior to determining that the vulnerability of the computer system is remedied.

2. The system of claim 1, comprising a state change indicating component configured to render the state change detectable.

3. The system of claim 2, the state change indicating component configured to set a flag in a registry of the computer system, the flag indicating the state change.

4. The system of claim 1, at the elevated security level, the security component providing access to the computer system over the network to information from a known or secure network location.

5. The system of claim 1, at least one of a second user or an administrator of the computer system enabled to change a configuration of the security component.

6. The system of claim 1,
   the security component configured via a graphical user interface, and
   the graphical user interface configured to present to a second user information on the vulnerability of the computer system and to receive a second user input instructing the computer system to modify the security level.

7. The system of claim 1, the elevated security level comprising an isolated mode, and the security component configured to exit the isolated mode when at least critical updates of the requested at least one software update are installed on the computer system.

8. The system of claim 1, the fixing component identifying the at least one software update by analyzing configuration databases stored on the computer system.

9. The system of claim 1, wherein the state change is detected upon at least one of installing new software, updating existing software, rebooting the computer system, or returning to a previous state of the computer system.

10. The system of claim 1, the fixing component configured to determine that the vulnerability of the computer system is remedied and provide, in response to the determination, at least one instruction to the security component, the at least one instruction instructing the security component to exit the elevated security level.

11. The system of claim 3, the security component monitoring the state change indicating component to determine whether the flag is set.

12. A method for protecting a computer system comprising a computing device, the computer system connected to a network, the method comprising:
   in response to detection of restoring the computer system to a previous state indicating a state change of the computer system, raising a security level of the computer system to an elevated security level, wherein the state change of the computer system may result in vulnerability of the computer system;
   providing an indication to a user that the security level of the computer system has been raised to the elevated security level;

determining whether user input is received instructing the computer system to exit the elevated security level prior to determining that the vulnerability of the computer system is remedied;

when it is determined that the user input is not received:

determining whether the vulnerability of the computer system is remedied; and exiting the elevated security level when it is determined that the vulnerability of the computer system is remedied; and when it is determined that the user input is received, exiting the elevated security level prior to determining that the vulnerability of the computer system is remedied.

13. The method of claim 12, comprising setting an indication to indicate the state change.

14. The method of claim 13, comprising setting a flag to indicate the state change.

15. The method of claim 12, comprising, at the elevated security level, providing access to the computer system to incoming network traffic from a known or secure network location.

16. The method of claim 12, comprising providing at least one option for the user to lower the security level, the option comprising an option to lower the security level when the computer system is at the elevated security level.

17. The method of claim 12, comprising:

determining software updates installed on the computer system;

comparing the installed software updates with available software updates that are not installed on the computer system; and installing the available software updates on the computer system.

18. The method of claim 12, comprising determining when critical updates are installed on the computer system after the state change.

19. The method of claim 12, comprising lowering the security level when at least critical updates of a requested at least one software update are installed on the computer system.

20. A method for protecting a computer system comprising a computing device, connected to a network, the method comprising:

prior to a state change in the computer system, setting an indication to indicate that a state of the computer system is about to change, the indication set in response to detection of restoring the computer system to a previous state, and wherein the state change may result in vulnerability of the computer system;

in response to setting the indication, raising a security level of the computer system to an elevated security level;

providing a notification to a user that the security level of the computer system has been raised to the elevated security level;

determining whether user input is received instructing the computer system to exit the elevated security level prior to determining that the vulnerability of the computer system is remedied;

when it is determined that the user input is not received:

determining whether the vulnerability of the computer system is remedied; and exiting the elevated security level when it is determined that the vulnerability of the computer system is remedied; and when it is determined that the user input is received, exiting the elevated security level prior to determining that the vulnerability of the computer system is remedied.

* * * * *